United States Patent
Janakiraman

(10) Patent No.: US 12,126,642 B2
(45) Date of Patent: *Oct. 22, 2024

(54) NETWORK EMBEDDINGS MODEL FOR PERSONAL IDENTIFIABLE INFORMATION PROTECTION

(71) Applicant: Hewlett Packard Enterprise Development LP, Spring, TX (US)

(72) Inventor: Ramsundar Janakiraman, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,860

(22) Filed: Jan. 6, 2023

(65) Prior Publication Data
US 2023/0146382 A1   May 11, 2023

Related U.S. Application Data

(63) Continuation of application No. 16/429,935, filed on Jun. 3, 2019, now Pat. No. 11,563,760.

(51) Int. Cl.
*H04L 29/00* (2006.01)
*H04L 9/40* (2022.01)

(52) U.S. Cl.
CPC .......... *H04L 63/1425* (2013.01); *H04L 63/20* (2013.01)

(58) Field of Classification Search
CPC ......... H04L 29/06938; H04L 29/06931; H04L 29/06925; H04L 29/06911; H04L 63/1425; H04L 63/20; H04L 63/0428; H04W 12/02
See application file for complete search history.

(56) References Cited

U.S. PATENT DOCUMENTS

| | | | |
|---|---|---|---|
| 9,047,488 B2* | 6/2015 | Allen | G06F 21/6254 |
| 9,202,078 B2 | 12/2015 | Abuelsaad et al. | |
| 10,102,478 B2 | 10/2018 | Bouchard et al. | |
| 10,693,900 B2* | 6/2020 | Zadeh | H04L 43/045 |

(Continued)

OTHER PUBLICATIONS

Gensim, "Topic Modelling for humans", online available at: <https://radimrehurek.com/gensim/>, Retrieved on: Feb. 27, 2020, pp. 2.

(Continued)

*Primary Examiner* — Jeffrey C Pwu
*Assistant Examiner* — Helai Salehi
(74) *Attorney, Agent, or Firm* — Hewlett Packard Enterprise Patent Department

(57) ABSTRACT

Systems and methods for providing remote network security using a network embeddings model are provided. A method consistent with the present disclosure includes retrieving a corpus of network activity data associated with a first network. The network activity data may be generated from users within the first network submitting network requests for network assets to service the network requests. The method also includes creating a crafted encoded corpus by selecting a subset of the corpus of network activity data and creating a network embeddings model based on the crafted encoded corpus. Lastly, the method includes generating an alert in an event that the network security system identifies an anomaly associated with the crafted encoded corpus of network activity data.

20 Claims, 9 Drawing Sheets

(56) References Cited

U.S. PATENT DOCUMENTS

| | | |
|---|---|---|
| 2015/0081562 A1 | 3/2015 | Roullier et al. |
| 2018/0082082 A1 | 3/2018 | Lowenberg et al. |
| 2018/0196800 A1 | 7/2018 | Volkovs et al. |
| 2020/0186544 A1* | 6/2020 | Dichiu ............... H04L 63/1416 |

OTHER PUBLICATIONS

Ide, N., "Corpus Encoding Standard: SGML Guidelines for Encoding Linguistic Corpora", Research Paper. Retrieved on Oct. 19, 2018, pp. 7.

Liefke, H. et al., "XMill: an E Cient Compressor for XML Data", Research Paper, Retrieved on Oct. 18, 2018, pp. 12.

Mikolov et al., "Efficient Estimation of Word Representations in Vector Space", Sep. 7, 2013, pp. 1-12.

Mikolov, T., et al., "Distributed Representations of Words and Phrases and their Compositionality", Oct. 16, 2013, pp. 1-9.

Ong, Y. et al., "Context-Aware Data Loss Prevention for Cloud Storage Services", Research Paper, Retrieved on Oct. 19, 2018, pp. 8.

Pennington et al., "GloVe: Global Vectors for Word Representation", Proceedings of the 2014 Conference on Empirical Methods in Natural Language Processing, Association for Computational Linguistics, Oct. 25-29, 2014, pp. 1532-1543.

Rothe, S. et al., "AutoExtend: Combining Word Embeddings with Semantic Resources", Research Paper, Computational Linguistics, vol. 43, No. 3, Sep. 15, 2017, pp. 593-617.

Skorkin, A., "What Every Developer Should Know About URLs", (Web Page), May 4, 2010, 13 Pgs.

* cited by examiner

| ServerName | DatabaseName | LogsGenerated | DurationInSeconds | Usernames | TimeStamp |
|---|---|---|---|---|---|
| ex-08-01 | ex-08-db151 | 135 | 277213 | UserA | 09:01:23 |
| ex-03-05 | ex-03-db039 | 115 | 86394 | UserB | 09:01:44 |
| ex-08-11 | ex-08-db240 | 2068 | 172839 | UserB | 09:01:49 |
| ex-02-09 | ex-02-db127 | 118 | 86405 | UserA | 09:01:52 |
| ex-04-10 | ex-04-db223 | 26 | 86405 | UserD | 09:01:52 |
| ex-05-03 | ex-05-db242 | 845 | 68407 | UserC | 09:02:06 |
| ex-09-05 | ex-09-db251 | 4705 | 316826 | UserD | 09:02:07 |
| ex-01-07 | ex-01-db021 | 227 | 190798 | UserA | 09:02:09 |
| ex-08-07 | ex-08-db061 | 592 | 82792 | UserB | 09:02:30 |
| ex-01-09 | ex-01-db217 | 4635 | 410411 | UserC | 09:02:36 |
| ex-03-02 | ex-03-db242 | 4717 | 597654 | UserC | 09:02:54 |
| ex-08-09 | ex-08-db178 | 1885 | 172807 | UserC | 09:03:23 |
| ex-08-07 | ex-08-db106 | 10134 | 597604 | UserD | 09:06:13 |

|          | Server 1 | Server 2 | Server 3 | Server 4 | Server 5 |
|----------|----------|----------|----------|----------|----------|
| Server 1 | 1        | 2        | 6        | 3        | 1        |
| Server 2 | 2        | 4        | 1        | 5        | 0 603    |
| Server 3 | 2        | 7 601    | 1        | 2        | 2        |
| Server 4 | 1        | 5        | 3        | 6        | 1        |
| Server 5 | 2        | 5        | 1        | 4 602    | 2        |

NETWORK EMBEDDINGS MODEL FOR PERSONAL IDENTIFIABLE INFORMATION PROTECTION

CROSS REFERENCE TO RELATED APPLICATIONS

This application is a continuation of, and claims the priority benefit of, U.S. patent application Ser. No. 16/429,935, filed on Jun. 3, 2019, now U.S. Pat. No. 11,563,760 which is incorporated herein by reference in its entirety.

BACKGROUND

Natural Language Processing (NLP) involves the programming of computers to process, analyze, and learn from large amounts of natural language data. With advances in NLP, specifically in the areas of auto-encoding, significant progress has been made in the ability to learn semantics from documents in an unsupervised manner from unlabeled data. Embeddings techniques have recently been employed to solve various NLP problems.

Similar to the challenges of developing applications to operate in an unsupervised manner, differentiating simple outliers from anomalies is a challenge for network security applications which aim to operate in an unsupervised manner with limited security administrators that can label the data. As each computer network is unique, developing network security systems to generate less false positives is desired.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2 is a network data transaction source of server accesses within a computer network, according to one or more examples of the present disclosure.

DETAILED DESCRIPTION

Figure 1:
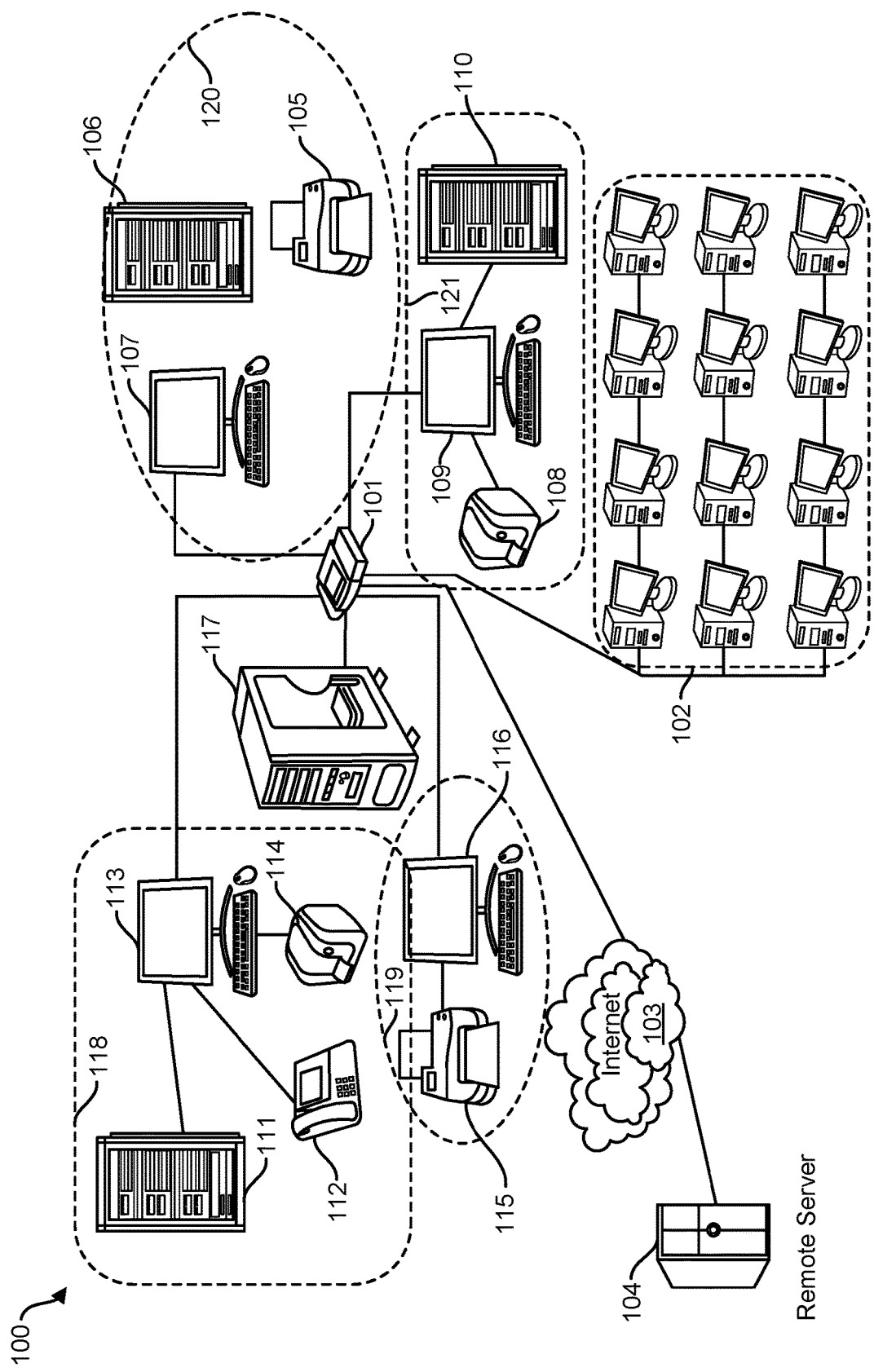
FIG. 1 is a computer network which can be monitored by a network security system, according to one or more examples of the present disclosure.

Illustrative examples of the subject matter claimed below may now be disclosed. In the interest of clarity, not all features of an actual implementation are described in this specification. It may be appreciated that in the development of any such actual implementation, numerous implementation-specific decisions may be made to achieve the developers' specific goals, such as compliance with system-related and business-related constraints, which may vary from one implementation to another. Moreover, it may be appreciated that such a development effort, even if complex and time-consuming, would be a routine undertaking for those of ordinary skill in the art having the benefit of this disclosure.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

One of the challenges in developing network security systems is the ability to effectively distinguish simple outliers from anomalies. An outlier is defined herein as an event that is different from all other members of a particular group or set. An anomaly is defined herein as an event that deviates from what is standard, normal, or expected. Generally, network security systems are designed to identify anomalies as events that are more likely to indicate unauthorized access, misuse, malfunction, modification, destruction, or improper disclosure. The inability for a network security system to effectively distinguish between simple outliers and anomalies often leads to false positives. A significant degree of false positives can cause network security administrators to lose confidence in a network security system to generate quality alerts which may make the network system even less secure due to a lack of sufficient oversight.

Embedding techniques (e.g., character, word, sentence, and paragraph embeddings) have been used for dimensionality reduction and semantic deduction to improve accuracy and performance improvements of natural language processing (NLP) models. Generally, embeddings techniques have been employed to understand word relationships in a document or "corpus." Advantageously, the present disclosure provides a manner in which word embeddings can be used for personal identifier information and privacy protection to leverage NLP as a generic technique for various use cases without the burden of implementing data encryption or hashing techniques to decrypt the data prior to analysis of the data.

Herein, word embeddings is defined as a vector representation (e.g., vector of numbers) of a document vocabulary which is capable of capturing the context of a word in a document. A corpus is defined as a body of words within a text or collection of texts. The present disclosure provides an embeddings model based on word embeddings techniques (and/or other embeddings techniques) to build a vector representation of transaction records with crafted sequence formulations (e.g., network activity sentences) to better identify behavioral interactions, thereby anomalies, within network security systems. In addition, comparing one or more snapshots of embeddings spaces can provide insight into anomalies, according to one or more examples of the present disclosure.

In one implementation, anomalies may be identified based on the variance in the proximity between entities in embeddings representations generated over different periods of time. In some implementations, proximity (e.g., with respect to which network assets are near each other) may be defined as a network asset that is listed within a transactions log within three entries of another network asset within the log. In another implementation, proximity may be defined with respect to time. For example, proximity may be established if a network asset is listed within fifteen minutes of another listed network access request. A corpus, within a computer network environment, may include network users whom have generated a service request from any of available network assets within a network or subnetwork. Furthermore, a crafted encoded corpus may consist of a portion of the data within a single corpus or two or more corpuses. A crafted encoded corpus may have a sequence of network activities such that a trained network security system can differentiate between simple outliers and anomalies. For example, a crafted encoded corpus may include thousands or millions of sequenced network activities listed in a transactions log.

In addition, a crafted encoded corpus may include hostnames, protocol information (e.g., TCP), ports, IP addresses, MAC addresses, remote addresses, authentication information, activity description, timestamps, ping times, client devices, network users, network asset state information, log files, HTTP code, pages requested, user agents, referrers, bytes served, errors, active directory logs, proxy logs, etc.

Herein, a network embeddings technique is defined as a technique to generate vector representations for each network asset, application name, and other deep packet information extracted from network transaction records in a corpus (or crafted encoded corpus) based on a presence of each of the plurality of network assets that are proximate (e.g., near) thereto. For instance, the vector representations assigned to each network asset includes a number of times that the assigned network asset is found near the other network assets within the corpus (or crafted encoded corpus). In some implementations, a network asset may include network equipment (e.g., a network server, tablet, laptop, printer, workstation, mainframe, router, bridge, etc.). In addition, a network embeddings technique may be used to analyze the network activity associated with a network software application, file, filename, authentication ticket, resource parameter, and embedded personal identifiable information that were encoded or encrypted to preserve anonymity. In addition, a network embeddings technique may also be used to analyze simple sequences of servers accessed by users and/or sequences of users accessing a specific server.

A network embeddings model may be implemented as a vector space model that represents (e.g., embeds) network assets in a continuous vector space where semantically similar network assets are mapped to nearby points (e.g., embedded nearby each other). A network embeddings model may depend on the distributional hypothesis which posits that network assets that appear in the same or similar contexts are related. Count-based models (e.g., latent semantic analysis) and predictive models (e.g., neural probabilistic language models) may leverage the distributional hypothesis. Count-based models may also include processes to compute the statistics of how often some network assets appear next to each other within a network activity log (e.g., transactions log). Predictive models, on another hand, attempt to predict the use of a network asset from its neighboring network assets within a network activity log in terms of learned, small, dense embeddings vectors. These embeddings vectors may be implemented as parameters of the network embeddings model.

Furthermore, a corpus within a network security environment may include transactions records (e.g., conversations). For example, a corpus may include Dynamic Host Configuration Protocol (DHCP) or Domain Name System (DNS) transaction records with Deep Packet Inspection (DPI). In one implementation, a network embeddings model may be trained on a corpus or crafted encoded corpus that includes a sequence of DNS resolutions of servers on a particular workday (e.g., by a particular user). For example, the DNS resolutions are of top 'm' (m<=) normalized servers, grouped by per user, per day basis.

The DNS transaction records may include DNS queries (e.g., recursive, iterative, and non-recursive), address mapping records, IP Version 6 address records, canonical name records, mail exchange records, name server records, reverse-lookup pointer records, certificate records, service location records, text records, and state of authority records, etc.

The accuracy of the results may be influenced by the location of the network feed and the data preparation in addition to the network embeddings model training with the corpus (or crafted) data. Advantageously, a network embeddings technique may be employed to capture contextual similarity and to reduce dimensionality of representation. In some implementations, each dimension or number in the vector space can capture an attribute.

Turning now to the drawings, FIG. 1 is a computer network 100 which can be monitored by a network security system (e.g., located on a remote server 104), according to one or more examples of the present disclosure. As shown, network 100 includes several network domains (e.g., subnets 118-121). In addition, network system 100 includes a plurality of personal computers 102 which can access the network assets within each of the subnets 118-121. In some implementations, the subnets 118-121 may be wirelessly coupled together by a router 101 or other network device.

Subnet 118 may be assigned to a specific department (e.g., Finance department). As shown, subnet 118 includes a server mainframe 111, a network telephone 112, a computer system 113, and a network printer 114. Alternatively, the subnet 119 may be assigned to a different department (e.g., Executive Assistant team) and may include a network printer 115 and computer system 116. Subnet 120 may be assigned to yet a different department (e.g., Billing department) and may include a network printer 105, a mainframe 106, and a computer system 107. Lastly, subnet 121 may be assigned to another department (e.g., Engineering) and may include a network printer 108, a computer system 109, and a mainframe 110. In addition, network 100 also includes a workstation 117 that is coupled to the router 101 and thereby wirelessly coupled to subnets 118-121. Network users can use any of the plurality of personal computers 102 to access the network assets within the network 100.

Remote server 104 may send a request to retrieve network activity data over the Internet 103 from the network assets on the network 100. For example, a record or log of requests performed by the network assets on the network 100 within a specific time frame may be sent to remote server 104 over the Internet 103. In one implementation, a network security application (not shown) is resident in the remote server 104. The security application can employ a network embeddings technique to distinguish between simple outliers and identify anomalies within a network.

In some implementations, the network assets and/or the network users can be anonymized, with respect to their usernames, to ward against potential breaches. For example, the identity of the network assets and network users may be encoded and then transmitted to remote server 104 for security analysis. In some implementations, after the exported network data is fully analyzed by a network security application within the remote server 104, the remote server 104 sends a notification to a network administrator of network 100 informing whether an anomaly was detected from the network activity.

It should be understood by those having ordinary skill in the art that the present disclosure is not limited to a network 100 with a single remote server 104. The present disclosure may be employed such that network 100 has several remote servers 104 each having a software application to implement a network embeddings technique and a visualization mapping thereof.

FIG. 2 is a network data transaction source (e.g., transactions log 200) of server accesses within a computer network, according to one or more examples of the present disclosure. A corpus (e.g., crafted encoded corpus) 201 may be generated from the transactions log 200 of formulated text or sequences based on the semantics intended to be captured. In one or more implementations, a corpus (e.g., crafted encoded corpus) includes tags, headings (e.g., column headings in spreadsheets), column names (e.g., from databases), etc. which is used as information to extract useful semantics.

In the implementation shown, transactions log 200 includes several entries 203 relating to activities within a computer network. As shown, transactions log 200 includes several categories or lists of data 202a-202d which can be used to create a crafted encoded corpus as will be explained in more detail below. Notably, transactions log 200 includes a list of network assets (e.g., servers) which have been requested to perform tasks on a certain network, a list of database names accessed by users, logs generated, the duration (in seconds) that the servers were accessed, usernames which accessed the servers, and timestamps.

In one implementation, a list 202a of server names, a list 202b of time durations of the accesses, a list 202c of usernames which accessed the network assets, and the list 202d of timestamps may be used to create sequence formulations for a single crafted encoded corpus from any entry (e.g., entry 203), in one implementation, or for two or more crafted encoded corpuses in other implementations. One having ordinary skill in the art should appreciate that a corpus is not limited to a transactions log and that a crafted encoded corpus is not limited to a list of server names and duration times that each task was performed. In some implementations, a corpus may include a network flow record expressed with some regularization methods. In some implementations, a network administrator can perform regularization to configure or reconfigure a corpus or crafted encoded corpus to influence the input. For example, a regularization method may include a specific time range or data, expressed in, for example an UTC time format can be represented as time of day (e.g., morning or evening) using time zone with respect to the deployment location instead of network administrator location. Another example would be to compare the sent and received bytes or use the PCR (Producer-Consumer ratio) and convert to terms like download or upload. Moreover, regularization can modify or enhance raw data in the crafted encoded corpus to human interpretable terms. In addition, a crafted encoded corpus may be constructed based on configured defaults or by a network administrator (e.g., high-tier network administrator). An example of regularization is described in reference to FIG. 4.

For instance, a finance employee's workflow may involve accessing and/or working on a spreadsheet or a document on a document repository followed by printing the spreadsheet/document on a secure printer. In contrast, an engineer's workflow might involve updating their local copy of code from a code repository or checking in their changes to the code-repository followed by updating the bug or feature request in a bug repository. Network embeddings can capture the sequence of server accesses by a user and can embed the semantics of the server according to departmental rules, trends, and/or purpose of the resource on the network. For example, when a word embeddings model is employed to train an example corpus, the embeddings model may group a plurality of finance servers and engineering servers in proximity of each other, respectively, in a high-dimensional embeddings space.

Advantageously, network embeddings applied to a corpus (or crafted encoded corpus) can capture the semantics of the users. For example, a multi-entity sentence may be expressed in a manner that is comprehended by humans (e.g., "Tom's-laptop downloaded a large binary file from a file repository on Monday morning"). This example captures the semantics of mixed entities—user, server, time, interaction (download, upload or transact) and content. In addition, network embeddings can account for network records over a long period of time and can capture relationships across entities.

In some implementations, the network assets and/or the network users can be anonymized to preserve the identity of the network entities, like users, devices and servers, and also to ward against potential security breaches. For example, the identity of the network assets and network users can be encoded and then transmitted outside of the network for security analysis. A network administrator may have access to a key to decode the anonymized network data and after the exported network data is fully analyzed by an external network security system (e.g., in a remote server 104 of FIG. 1), alerts can be sent based on the analyzed network activity. The exported data can include tags, headers, and column names such as, but not limited to, Comma-Separated Values (CSV) and Javascript Object Notation (JSON) files such that semantic context can be deduced from the network data. These tags, headers, and columns may serve an anchor role in the formulation of a corpus thus assisting to extract any lost context with anonymization. In addition, these tags also aid in the translation of raw data into meaningful text when regularization techniques are applied thereto.

Furthermore, in some implementations, when a corpus covers a long time-range, legitimate relationships among network assets, users, etc. reveal themselves over time. When the frequency of the entities in the corpus across longer time frame is taken into account, it sheds more information. Employing a visualization scheme such as T-distributed Stochastic Neighbor (t-SNE), Uniform Manifold Approximation and Projection (UMAP), or other proprietary visualization techniques and maps can be used to identify the proximity of network devices (e.g., servers) in an attempt to determine their cohesiveness in usage patterns. Further, visualization schemes can also be used to capture the frequency of these entities in a dimension like the relative sizes of the dot or a sphere (2D vs 3D) to establish a trust factor on how much to rely on the cohesiveness of the blobs. The low frequency entities as well, based on subjective choice, can be established. Moreover, adding other visualization techniques such as the frequency related to the size of the dots captures the occurrences such that an administrator can make subjective inferences regarding the network assets and network activities.

Figure 3:
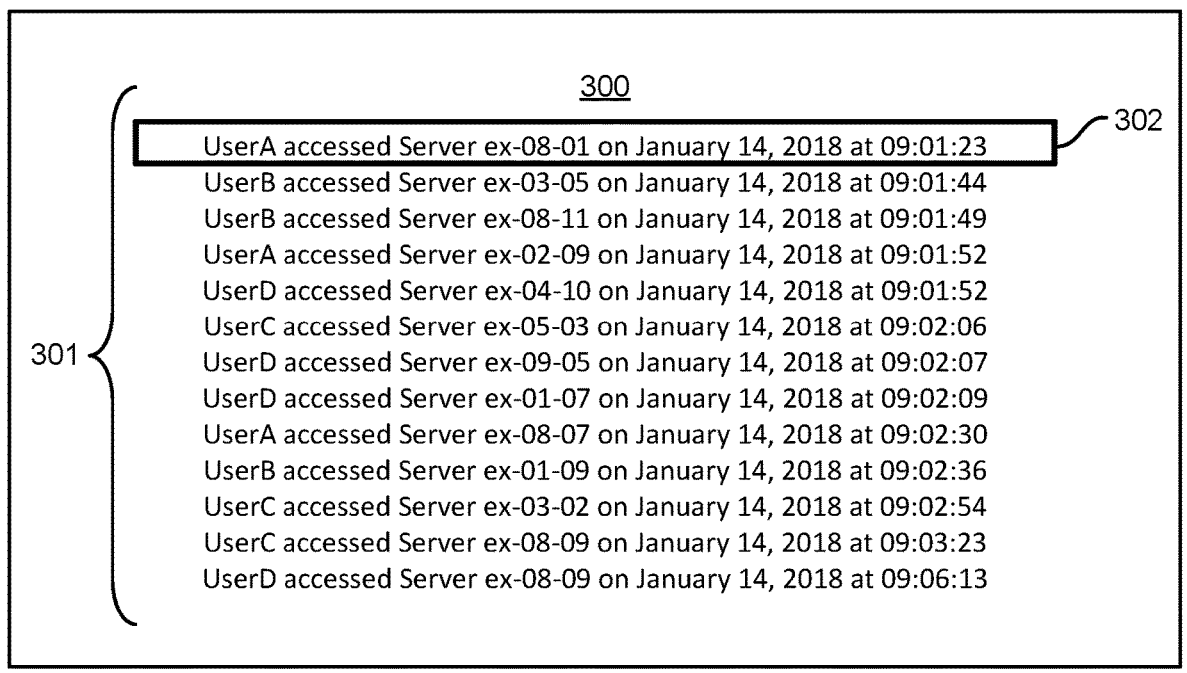
FIG. 3 is an example of a crafted encoded corpus, according to one or more examples of the present disclosure.

FIG. 3 is an example of a crafted encoded corpus 300, according to one or more examples of the present disclosure. In the implementation shown, crafted encoded corpus 300 includes sequence formulations 301 generated from the data in the transactions log 200 shown in FIG. 2. In one implementation, the sequence formulations 301 express a semantic relationship between a network asset, the requesting user, etc. For example, sequence formulation 302 expresses that User A accessed Server ex-08-01 on Jan. 14, 2018 at 09:01:23. The sequence formulations 301 may include additional contextual information obtained from data included in the crafted encoded corpus (e.g., User A accessed Server B in the morning on Aug. 3, 2018 and downloaded a large file with filename "FileZ"). Moreover, the sequence formulations may be encrypted. For example, the sequence formulations may be encrypted with hexadecimal values.

A corpus or crafted encoded corpus may be based on the desired entities capture in an embeddings space. For example, an embeddings space may be employed to captured server interactions. In one implementation, an embeddings space includes a corpus of sequence of servers (e.g., bug-repository, code-repository, build-server, cloud-analyzer, build-server, cloud-analyzer) grouped per user, per session. In another implementation, an embeddings space may be employed to capture the users (e.g., users/server/day) with a common workflow and temporal proximity. For example, an embeddings space may be employed as a sequence of all users who accessed a build server on a given day. In addition, an embeddings space may be employed to illustrate the user groups that access server groups and/or flow records expressed in simple language (e.g., according to one or more regularization methods).

Figure 4:
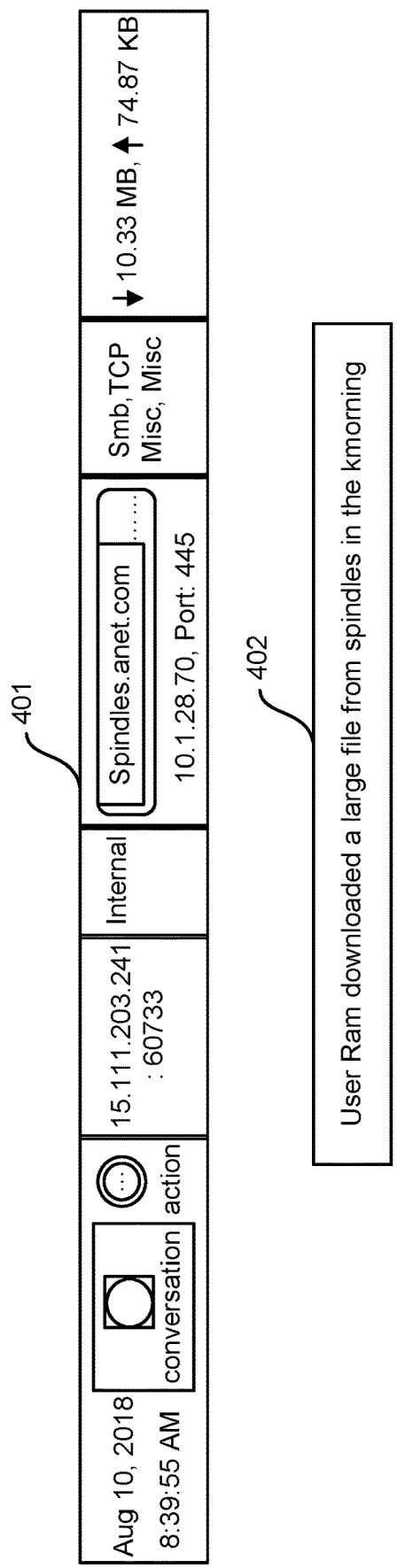
FIG. 4 is an example of one entry of a corpus which has undergone regularization, according to one or more examples of the present disclosure.

FIG. 4 is an example of one corpus entry 401 of a corpus (not shown) which has undergone regularization (e.g., regularized corpus entry 402), according to one or more examples of the present disclosure. As shown, the corpus entry 401 includes information associated with a particular network activity. For example, the corpus entry 401 includes a timestamp of a downloaded file from a particular server on a particular network client (e.g., desktop computer). As discussed herein, one or more regularization methods may be applied to the corpus entry 401 to create a regularized corpus entry 402. According to the example shown, regularized corpus entry 402 states: "[u]ser John downloaded a large file from Spindisk in the morning."

Figure 5:
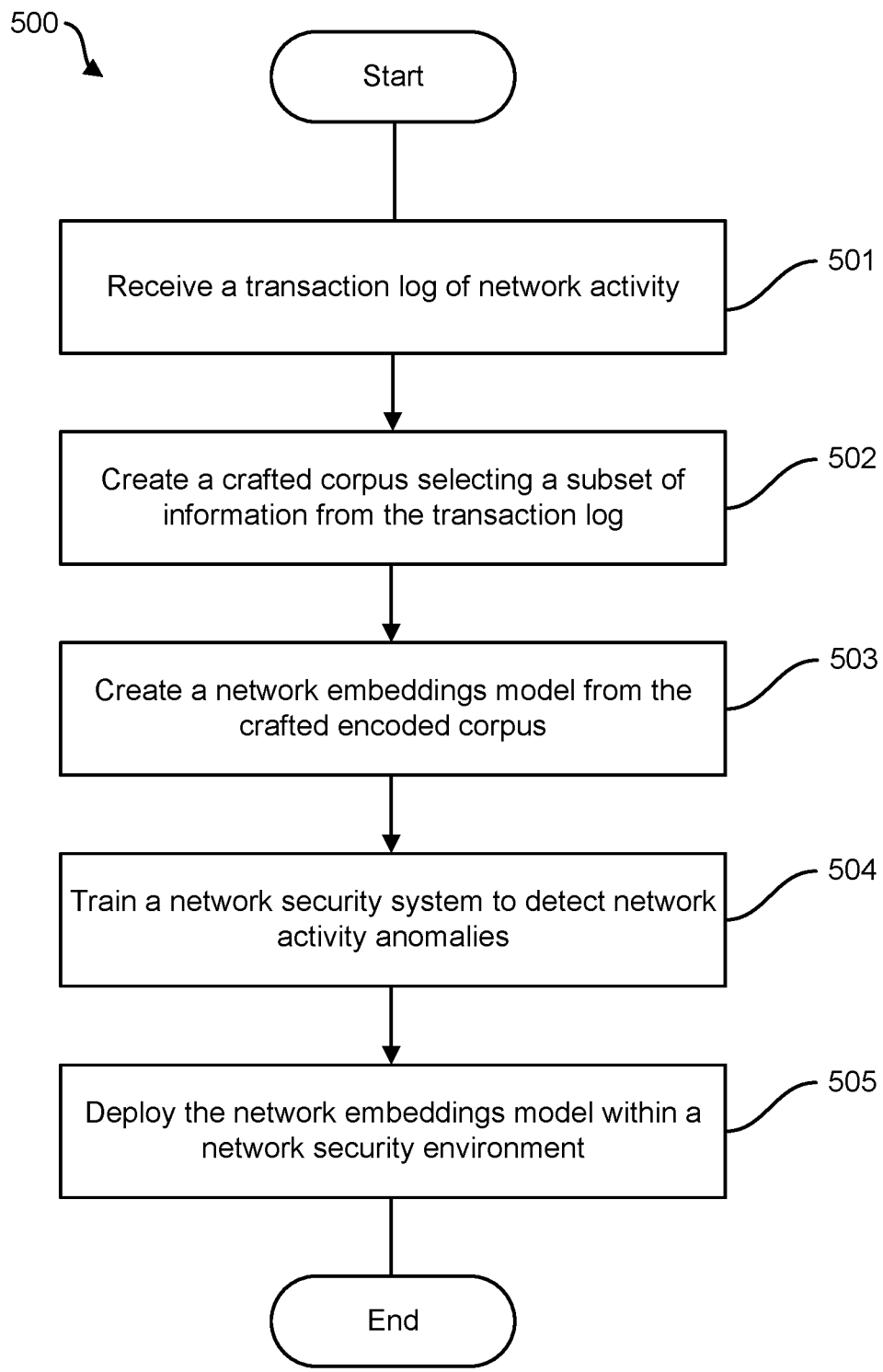
FIG. 5 is a flowchart for depicting a method for creating a network embeddings model for a network security system to identify network anomalies, according to one or more examples of the present disclosure.

FIG. 5 is a flowchart depicting a method 500 for creating a network embeddings model for a network security system to identify network anomalies, according to one or more examples of the present disclosure. The method 500 begins with receiving a transactions log of network activity (block 501). The transactions log of network activity may include the task history performed by network assets (e.g., servers, printers, etc.) within a network. In some implementations, the method 500 further includes creating a crafted encoded corpus by selecting a subset of information from the transactions log (block 502). It should be understood by those having ordinary skill in the art that creating a crafted encoded corpus is not necessary in all implementations.

Creating a crafted encoded corpus may, in some instances, reduce extraneous data that is not necessary for employing a network embeddings technique. For example, as shown in FIG. 2, only a portion of the data listed in a transactions log may be needed to determine the relationships between network assets and users. In one implementation, the crafted encoded corpus includes the requests sent by users to each network asset within a specified time period. In addition, the crafted encoded corpus may be subject to regularization methods by users (e.g., network administrators) to make the sequences more comprehendible. In some implementations, regularization methods can be used to capture semantic meanings (e.g., morning instead of 8:32 AM or file server instead of heapofdocs.mycompany.com).

Moving forward, the method 500 proceeds with creating a network embeddings model based on the crafted encoded corpus according to block 503. The network embeddings model may be implemented as vector representations which correlate to the "distance" (e.g., proximity) between entities listed in the crafted encoded corpus. For example, the network embeddings may indicate which sequence of network assets are commonly requested by certain users within a certain timeframe. It should be understood by one having ordinary skill in the art that the present disclosure is not limited to generating a single set of network embeddings from a single crafted encoded corpus. As such, the present disclosure may include two or more sets of network embeddings generated from two or more crafted encoded corpuses to provide insights for network security systems.

In some implementations, network administrators may be prompted or simply allowed to correct, validate, and/or label any discrepancies in the semantic relations in the network embeddings through proximity relations illustrated with standard embeddings visualization techniques (e.g., t-SNE, UMAP, or other proprietary visualization techniques).

Next, the method 500 includes training a network security system to detect network activity anomalies according to block 504. Training the network security system may include capturing existing behavior and identifying deviating trends over time. In some implementations, the training process includes training a machine learning network security system. The data sets used for the training may include the network embeddings. In some implementations, data sets from two or more crafted encoded corpuses may be used for the training. The data sets may be trained or retrained on a combined dimensional space.

In yet other implementations, crafted encoded corpuses generated from a plurality of network systems may be used to train any one or more network security systems. Furthermore, advanced models can use embeddings as a building block on one or more network systems. Next, the method 500 proceeds to deploying the network embeddings model within a network security environment (block 505). Advantageously, the network embeddings model may be used to detect network activity anomalies and to differentiate between them and simple outliers.

Figures 6, 7:
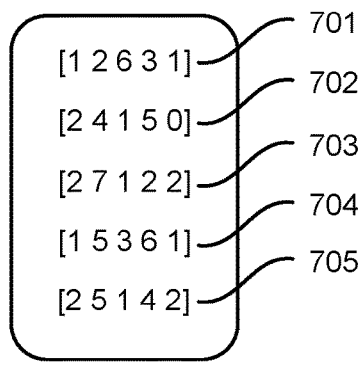
FIG. 6 is a co-occurrence matrix of network assets according to one or more examples of the present disclosure.
FIG. 7 is a set of vector representations associated with the network assets listed in the co-occurrence matrix of FIG. 6.

FIG. 6 is a co-occurrence matrix 600 of network assets (e.g., servers 1-5) according to one or more examples of the present disclosure. In one implementation, co-occurrence matrix 600 includes the network assets and the extent of their proximity with other network assets on a transactions log. In yet another implementation, co-occurrence matrix 600 includes the network assets and the number of times that they are proximate to other network assets on a transactions log.

For example, cell 601 within co-occurrence matrix 600 indicates that server 3 was found proximate to Server 2 seven times within a transactions log. Likewise, cell 602 within co-occurrence matrix 600 indicates that Server 5 was found near Server 4 four times. Lastly, cell 603 indicates that Server 2 was not found near Server 5 within a transactions log. As Servers 1-5 are exemplary, co-occurrence matrix 600 may include a plurality of other network assets.

It should be understood by those having ordinary skill in the art that the present disclosure is not limited to employing a co-occurrence matrix 600. In particular, the embeddings calculations could employ a skip-grams or a simple Bag-Of-Words technique.

FIG. 7 is a set 700 of vector representations 701-705 associated with the network assets listed in the co-occurrence matrix 600 of FIG. 6. Notably, vector representation 701 corresponds to Server 1, vector representation 702 corresponds to Server 2, vector representation 703 corresponds to Server 3, vector representation 704 corresponds to Server 4, and vector representation 705 corresponds to Server 5. As Servers 1-5 are exemplary, vector representations 701-705 may include vectors associated with a plurality of other network assets.

For example, a network system of one thousand network devices may be tracked by their requests to perform certain tasks. A co-occurrence matrix may be generated such that vector representations may be generated for each network device. The vector representations can be used to train a machine-learning enhanced network security system.

Figure 8:
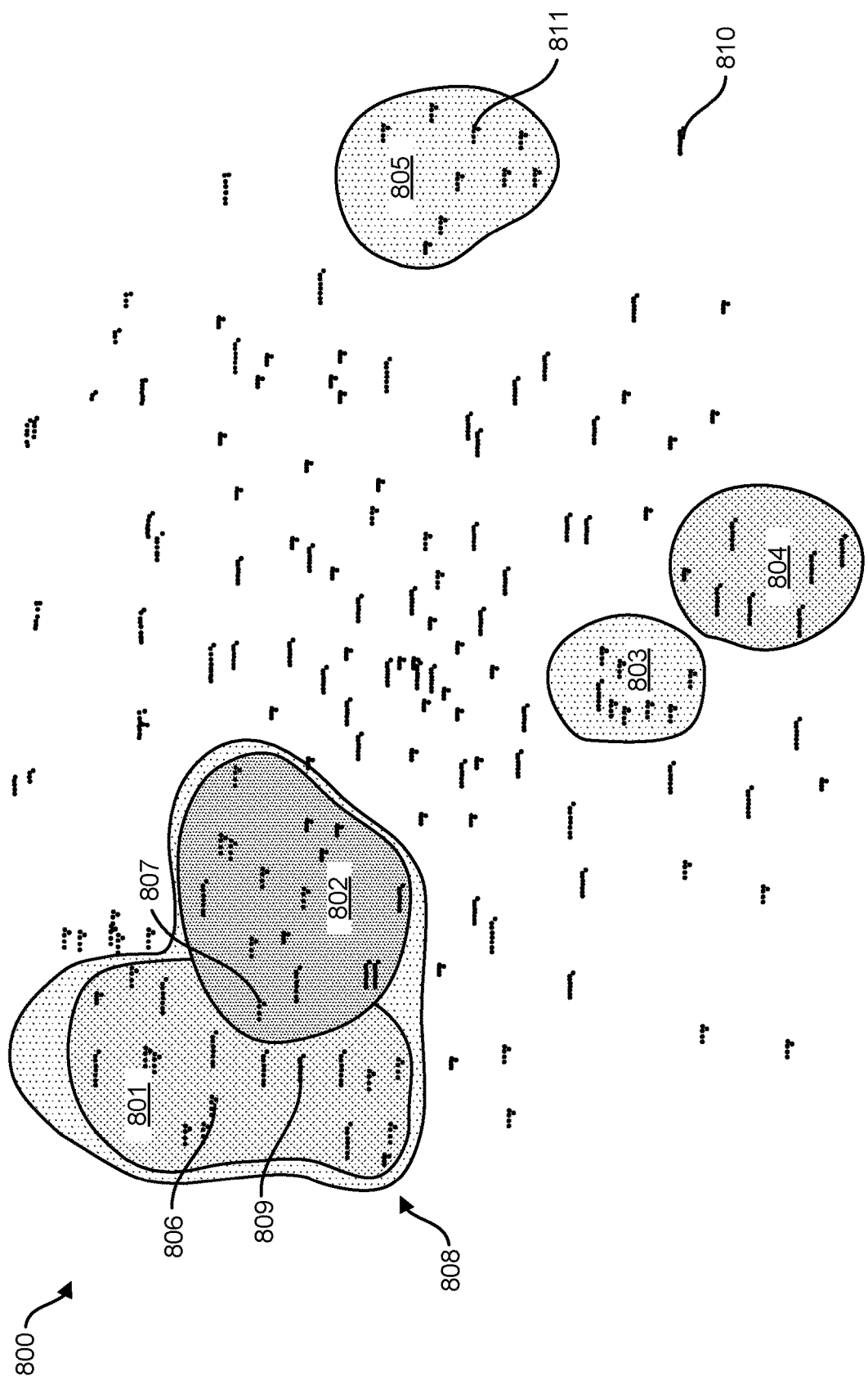
FIG. 8 is a semantic visualization map of a crafted encoded corpus of network activities, according to one or more examples of the present disclosure.

FIG. 8 is a semantic visualization map 800 of a crafted encoded corpus of network activities, according to one or more examples of the present disclosure. In one implementation, the semantic visualization map 800 may be generated by a remote server (e.g., remote server 104 of FIG. 1). In one implementation, semantic visualization map 800 is generated using a T-distributed Stochastic Neighbor embeddings (t-SNE) visualization technique. The t-SNE technique may comprise two main stages. First, t-SNE may construct a probability distribution over pairs of high-dimensional objects in such a way that similar objects have a high probability of being selected while dissimilar points have an extremely low probability of being selected. Secondly, t-SNE may define a similar probability distribution over the points in the low-dimensional map, and it may minimize the Kullback-Leibler divergence between the two distributions with respect to the locations of the points in the map.

In the example shown, semantic visualization map 800 includes a plurality of icons for network assets (e.g., icons 806, 807, 809, 810) within a network system. Herein, a semantic visualization map is defined as a map of network assets that are arranged in a manner that reveals how often the network assets are associated with each other. For example, icons for network assets that are within a cluster (e.g., clusters 801-805) reflect that the icons for network assets therein were listed in the transactions log proximate to each other. For example, an icon 806 is assigned to a first network asset whereas an icon 809 is assigned to a second network asset are both within cluster 801 which indicates that they may be accessed by network users within a short time frame from each. For instance, when the icon 806 for a network asset (e.g., network server) is accessed, the icon 809 assigned to a network asset (e.g., network printer) is generally accessed shortly thereafter.

In some implementations, semantic visualization map 800 may display a cluster 808 with two or more clusters (e.g., clusters 801, 802) therein. Furthermore, there may be icons 807 for the network assets that are in two or more clusters 801, 802. Accordingly, a crafted encoded corpus (e.g., information from a transactions log) may reveal that there may be sub-groups of network assets that are requested to perform tasks in sequence with each other or closely before or after each other. Icon 810 is assigned to a network asset illustrates that there may be several network assets within a network system which may perform tasks independently of other network assets such that a transactions log would not show a sequence or trend of requests from the icon 810 for a network asset associated with any other network asset on the network system.

In some implementations, a security threat is identified if a sequence of network assets is assessed in a manner that is inconsistent with the cluster of network assets that the sequence of network assets is associated with. For example, if a user accesses a sequence of network assets illustrated within one cluster (e.g., cluster 802) and then accesses a sequence of network assets illustrated within another cluster (e.g., cluster 804) in a manner that is atypical with respect to historical data, an alert may be generated and sent to a network administrator.

In yet another implementation of the present disclosure, the semantic visualization map 800 may be deployed to illustrate the relationship between users according to the network assets that they have accessed. For example, the clusters (e.g., clusters 801-805) illustrated may represent the users that access the same network assets. For instance, the users within cluster 801 may access the same network assets and the users within cluster 803 may also access the same network assets. In one implementation, a network security software application provided herein may determine that there may be a security threat if a user within one cluster (e.g., cluster 801) is accessing network assets in a sequence that are associated with users classified within another cluster (e.g., cluster 803). If a security threat is identified, an alert may be generated and sent to a network administrator.

Cluster 805 also includes an icon 811 for a network asset which is substantially larger than the other icons for network assets displayed on the semantic visualization map 800. The increased size of icon 811 may indicate that the representative network asset is associated with a higher frequency representation of the network asset within a corpus (or crafted encoded corpus). For example, the size of each icon for a network asset may be indicative of the frequency representation of a respective network asset within a corpus.

It should be appreciated by those having ordinary art that the present disclosure may implement various types of embeddings. For example, the present disclosure may include contextual embeddings models which can be applied to authentication servers, etc. For example, a crafted encoded corpus includes the following sequences: 1) User A accessed Server ex-08-01 on Jan. 14, 2018 at 09:01:23 and 2) User A accessed Server ex-08-01 on Jan. 15, 2018 at Terminal A. In the aforementioned example sequences, the term "at" refers to both time and location. Accordingly, a contextual embeddings model may be employed in a manner to differentiate terms within a crafted encoded corpus according to context. As such, the present disclosure provides the ability to capture polysemous words and terms in the application of embeddings for network security.

In addition, the employment of network embeddings may be accomplished using skip-gram, Bag-of-Words model, GloVe and any other embeddings mode according to the volume of data available. In other implementations, an embeddings model could also employ hyper-parameters from multiple levels of deep neural networks such as, but not limited to, an Embeddings for Language Models (ELMo) model, a Bi-directional Language Model (BiLM), and a Bi-directional Encoder Representation (BERT) model. In addition, an embeddings model can be employed to capture semantics of polysemous words by employing an attention-based approach. In some implementations, an embeddings model can be employed for security applications, particularly with a corpus that includes a sequence of destinations with the authentication servers.

Figure 9:
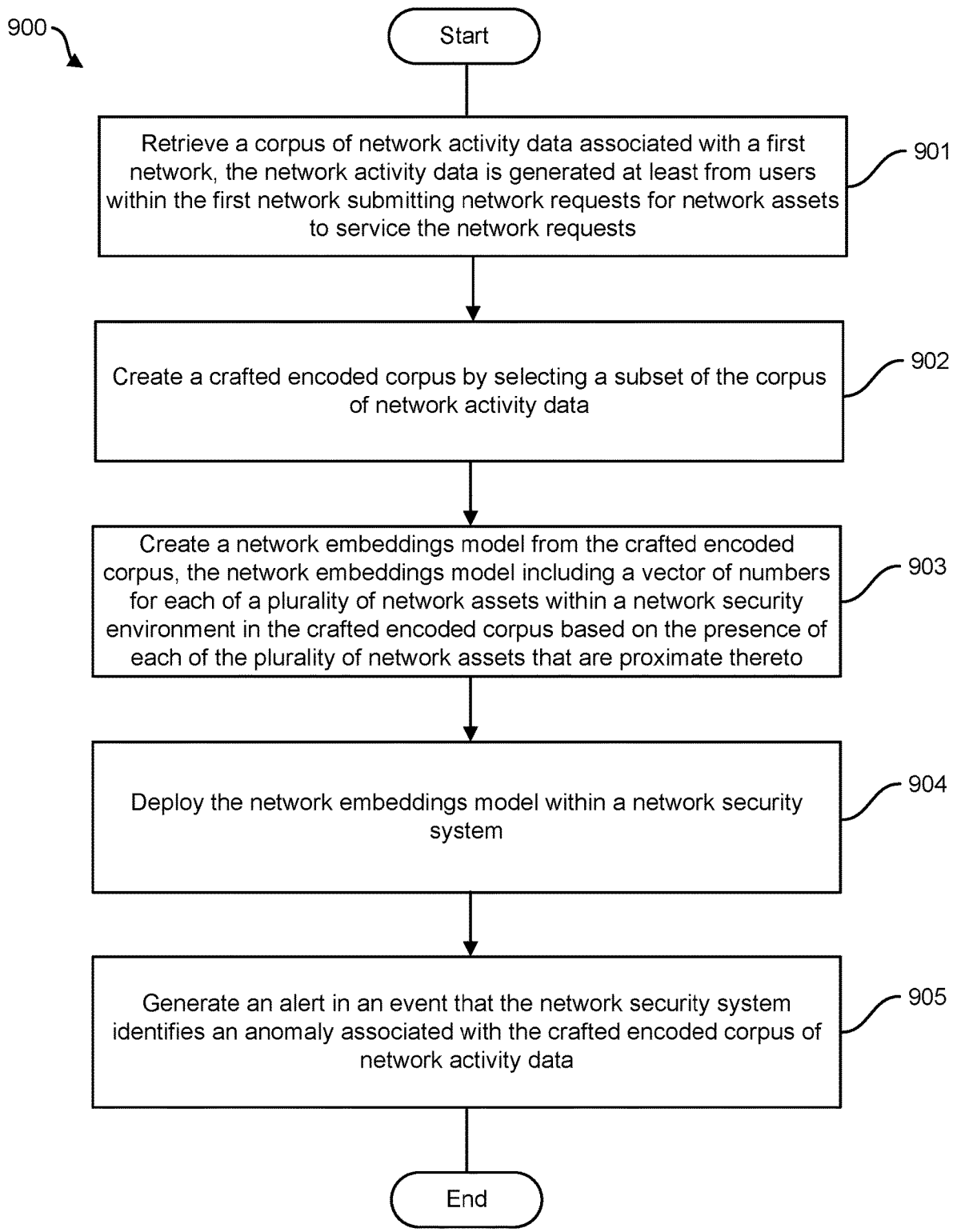
FIG. 9 is a flowchart of a method for providing remote network security by employing a network embeddings technique, according to one or more examples of the present disclosure.

FIG. 9 is a flowchart depicting a method 900 for providing remote network security by employing a network embeddings technique, according to one or more examples of the present disclosure. The method 900 begins with retrieving a corpus of network activity data associated with a first network (block 901). The network activity data may be generated from users within the first network submitting network requests for network assets to service these requests.

Next, according to block 902, the method 900 includes creating a crafted encoded corpus by selecting a subset of the corpus of network activity data. Next, the method 900 includes creating a network embeddings model from the crafted encoded corpus (block 903). In one implementation, the network embeddings model includes a vector of numbers for each of a plurality of network assets within a network security environment in the crafted encoded corpus based on the presence of each of the plurality of network assets that are proximate thereto. Further, the method 900 includes deploying the network embeddings model within a network security system (block 904) and generating an alert in an event that the network security system identifies an anomaly associated with the crafted encoded corpus of network activity data (block 905).

Figure 10:
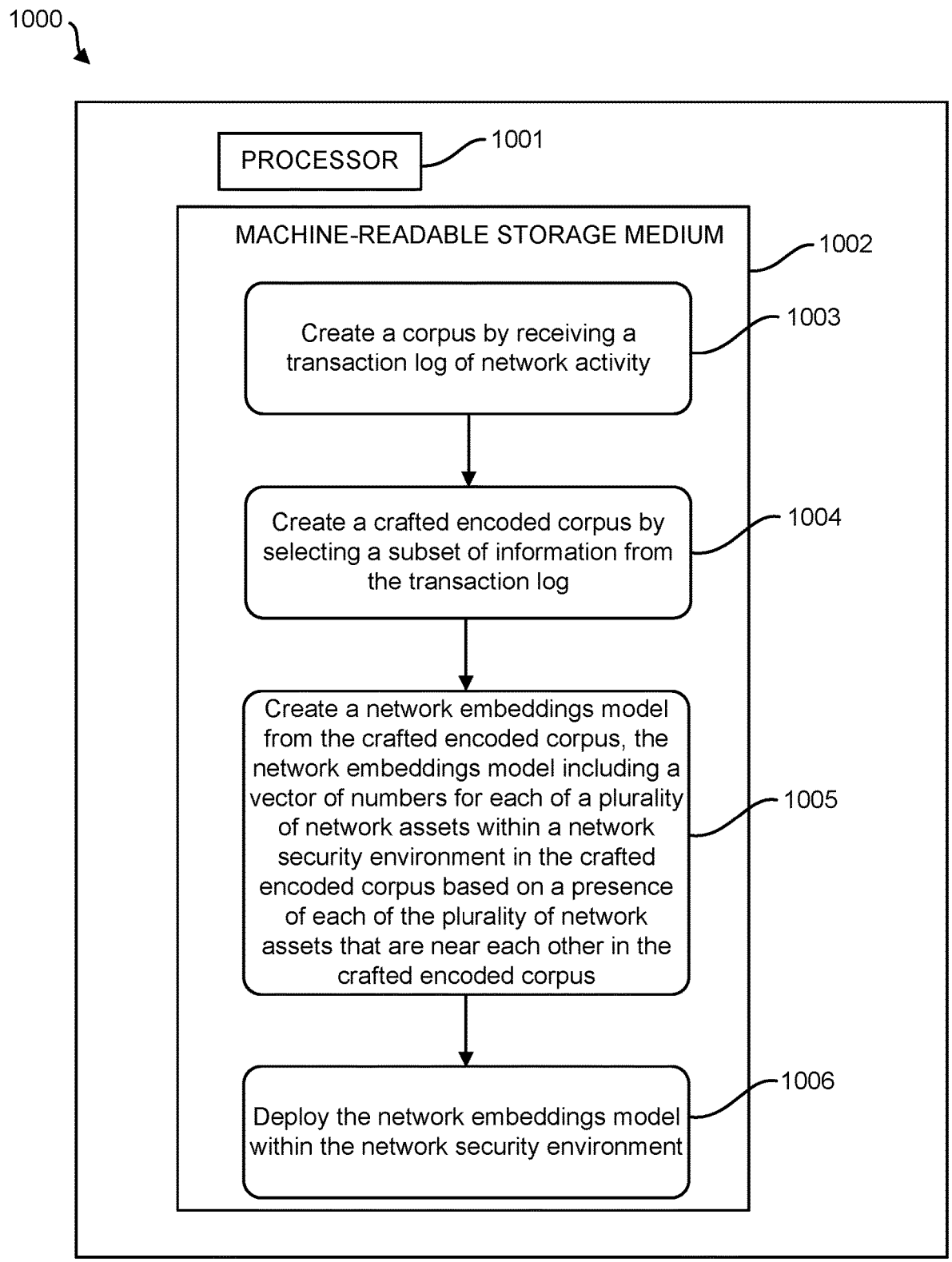
FIG. 10 is an illustration of a computing system, according to one or more examples of the present disclosure.

FIG. 10 is an illustration of a computing system 1000, according to one or more examples of the present disclosure. The computing system 1000 may include a non-transitory computer readable medium 1002 that includes computer executable instructions 1003-1006 stored thereon that, when executed by one or more processing units 1001 (one shown), causes the one or more processing units 1001 to provide remote network security by employing a network embeddings technique.

Computer executable instructions 1003 include creating a corpus by receiving a transactions log of network activity. Computer executable instructions 1004 includes creating a crafted encoded corpus by selecting a subset of information from the transactions log whereas computer executable instructions 1005 include creating a network embeddings model based on the created crafted encoded corpus. In some implementations, the network embeddings model includes a vector of numbers for each of a plurality of network assets within a network security environment in the crafted encoded corpus based on a presence of each of the plurality of network assets that are proximate to each other in the crafted encoded corpus. Lastly, computer executable instruction 1006 includes deploying the network embeddings model within the network security environment. It should be understood by one having ordinary skill in the art that the computer readable medium 1002 is not limited to the instructions 1003-1006. As such, more or less instructions may be included in the computer readable medium 1002.

It should be understood by those having ordinary skill in the art that a network system may be employed such that it has a tiered-administrator system. For example, certain classes of administrators have access to determine which data sets may be used to generate a crafted encoded corpus. In addition, certain classes of network administrators may be allowed to access semantic visualization maps while other network administrators may be allowed to modify clusters therein (and other regularization tasks), etc.

The foregoing description, for purposes of explanation, used specific nomenclature to provide a thorough understanding of the disclosure. However, it may be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for providing remote network security, comprising:
    receiving a transactions log of network activity, wherein the transactions log of network activity comprises a task history performed by a first network asset and a second network asset in a plurality of network assets within a network;
    generating a crafted encoded corpus comprising a subset of the transactions log of network activity and the plurality of network assets;
    generating a plurality of vector representations that correlate the plurality of network assets listed in the crafted encoded corpus to each other based on the network activity;
    determining that a distance between a subset of vector representations between the first network asset and the second network asset exceeds a threshold variance value over different periods of time, the determination identifying an anomaly in the network activity;
    training a network embeddings model based at least on the anomaly in the network activity and the subset of vector representations between the first network asset and the second network asset; and
    deploying the network embeddings model within a network security system for the plurality of network assets to detect network activity anomalies in the network security system in accordance with the training.

2. The method of claim 1, further comprising:
    creating a second crafted encoded corpus a second subset of the transactions log of network activity and the plurality of network assets; and
    generating a second plurality of vector representations that correlate the plurality of network assets listed in the second crafted encoded corpus to each other based on the network activity.

3. The method of claim 1, further comprising receiving user input to correct, validate, or label one or more discrepancies in the network embeddings model.

4. The method of claim 1, wherein the crafted encoded corpus further comprises a plurality of requests sent by users to the plurality of network assets.

5. The method of claim 1, further comprising generating an alert in an event that the network security system identifies an anomaly associated with the crafted encoded corpus of network activity data.

6. The method of claim 1, further comprising displaying a semantic visualization map to indicate one or more relationships between the plurality of network assets.

7. The method of claim 1, wherein the network activity comprises network requests to the plurality of network assets and functions performed by the plurality of network assets in response to the network requests.

8. The method of claim 1, wherein the subset of the transactions log of network activity identifies usernames that sent network requests to one of the plurality of network assets listed in the crafted encoded corpus.

9. The method of claim 1, wherein the crafted encoded corpus is automatically created based on input parameters submitted by an administrator.

10. The method of claim 1, wherein the crafted encoded corpus includes tags and headings which are used to create the network embeddings model.

11. The method of claim 1, further comprising:
determining a time from the transactions log of network activity; and
correlating the distance between the subset of vector representations based on the time.

12. The method of claim 1, further comprising:
generating a semantic visualization map representing the subset of vector representations between the first network asset and the second network asset,
wherein the semantic visualization map arranges the first network asset and the second network asset in accordance with a frequency that the first network asset and the second network asset are associated with each other.

13. The method of claim 4, wherein the network embeddings model indicates one or more sequences of network assets requested by users at a threshold frequency within a certain timeframe.

14. A non-transitory machine-readable storage medium encoded with instructions, which, when executed by a processor, cause the processor to:
receive a transactions log of network activity, wherein the transactions log of network activity comprises a task history performed by a first network asset and a second network asset in a plurality of network assets within a network;
generate a crafted encoded corpus comprising a subset of the transactions log of network activity and the plurality of network assets;
generate a plurality of vector representations that correlate the plurality of network assets listed in the crafted encoded corpus to each other based on the network activity;
determine that a distance between a subset of vector representations between the first network asset and the second network asset exceeds a threshold variance value over different periods of time, the determination identifying an anomaly in the network activity;
train a network embeddings model based at least on the anomaly in the network activity and the subset of vector representations between the first network asset and the second network asset; and
deploy the network embeddings model within a network security system for the plurality of network assets to detect network activity anomalies in the network security system in accordance with the training.

15. The non-transitory machine-readable storage medium of claim 14, wherein the instructions further cause the processor to:
create a second crafted encoded corpus by selecting a second subset of the transactions log of network activity and the plurality of network assets; and
generate a second plurality of vector representations that correlate the plurality of network assets listed in the second crafted encoded corpus to each other based on the network activity.

16. The non-transitory machine-readable storage medium of claim 14, wherein the instructions further cause the processor to receive user input to correct, validate, or label one or more discrepancies in the network embeddings model.

17. The non-transitory machine-readable storage medium of claim 14, wherein the crafted encoded corpus further comprises a plurality of requests sent by users to the plurality of network assets.

18. The non-transitory machine-readable storage medium of claim 14, wherein the instructions further cause the processor to generate an alert in an event that the network security system identifies an anomaly associated with the crafted encoded corpus of network activity data.

19. The non-transitory machine-readable storage medium of claim 14, wherein the instructions further cause the processor to display a semantic visualization map to indicate one or more relationships between the plurality of network assets.

20. The non-transitory machine-readable storage medium of claim 14, wherein the network activity comprises network requests to the plurality of network assets and functions performed by the plurality of network assets in response to the network requests.

* * * * *